United States Patent
Jumonville

(10) Patent No.: US 7,354,077 B1
(45) Date of Patent: Apr. 8, 2008

(54) QUICK CONNECT/DISCONNECT COUPLER WITH LOCKING STRAP

(76) Inventor: Jude Jumonville, 727 Main St., Crown Point, IN (US) 46307

( * ) Notice: Subject to any disclaimer, the term of this patent is extended or adjusted under 35 U.S.C. 154(b) by 0 days.

(21) Appl. No.: 11/714,988

(22) Filed: Mar. 8, 2007

(51) Int. Cl.
*F16L 37/18* (2006.01)

(52) U.S. Cl. .................. 285/312; 285/320; 285/81

(58) Field of Classification Search ............. 285/81, 285/82, 85, 87, 88, 312, 320; 24/306, 442
See application file for complete search history.

(56) References Cited

U.S. PATENT DOCUMENTS

| | | | | |
|---|---|---|---|---|
| 406,964 | A * | 7/1889 | Stedman et al. ............. | 285/1 |
| 2,518,026 | A * | 8/1950 | Krapp ....................... | 285/312 |
| 2,757,944 | A * | 8/1956 | Krapp ....................... | 285/129.1 |
| 4,871,195 | A * | 10/1989 | Parrish ....................... | 285/91 |
| 4,893,381 | A * | 1/1990 | Frankel ....................... | 24/16 R |
| 5,075,934 | A * | 12/1991 | Osedo ....................... | 24/16 R |
| 5,333,916 | A * | 8/1994 | Burkit et al. ............. | 285/97 |
| 5,505,500 | A * | 4/1996 | Webb et al. .............. | 285/223 |
| 5,598,995 | A * | 2/1997 | Meuth et al. .............. | 248/74.3 |
| 6,412,827 | B1 * | 7/2002 | Barclay et al. ............. | 285/312 |
| 6,447,016 | B2 * | 9/2002 | Collier ....................... | 285/81 |
| 6,683,258 | B1 * | 1/2004 | Tracy et al. ................ | 174/135 |
| 6,952,864 | B2 * | 10/2005 | Moreno ...................... | 24/712.3 |
| 2001/0045745 | A1 * | 11/2001 | Collier ....................... | 285/81 |
| 2003/0155765 | A1 * | 8/2003 | Thomas et al. ............. | 285/305 |
| 2004/0164550 | A1 * | 8/2004 | Knowles et al. ........... | 285/320 |

* cited by examiner

*Primary Examiner*—James M. Hewitt
(74) *Attorney, Agent, or Firm*—Marshall A. Burmeister

(57) ABSTRACT

A coupler with an elongated inner member with an axial channel therethrough that is adapted to be removably disposed within a passage extending through an outer member. The inner member has a surface at one end that is adapted to engage and seal on a surface of the outer member and a recess on the outer surface that accommodates a plurality of cams pivotally mounted on axes exterior to the outer member. The outer member has a slot extending therethrough confronting each cam, and each cam has a lever arm extending therefrom, each lever arm having a closed position in which the lever arm is disposed adjacent to the outer member and an open position outwardly of the outer member. A strap is mounted on a lever arms that has hooks on one side and loops on the other side, the hooks and loops adhering together when pressed together.

8 Claims, 1 Drawing Sheet

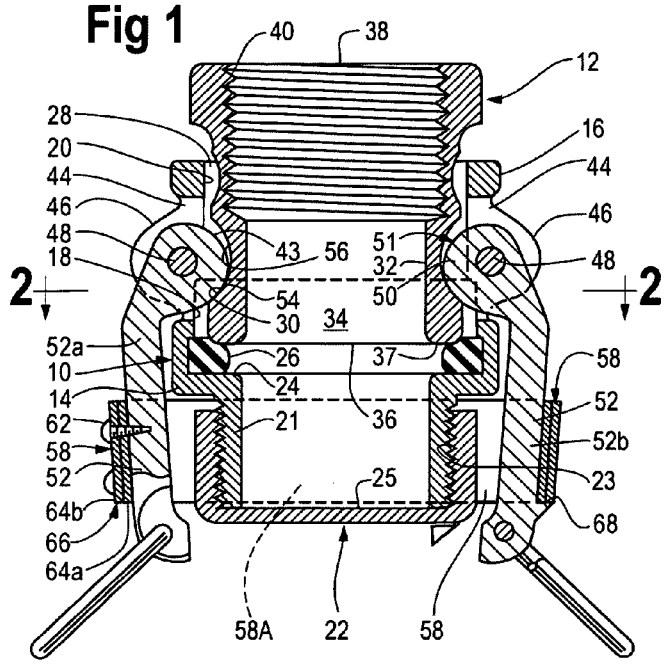
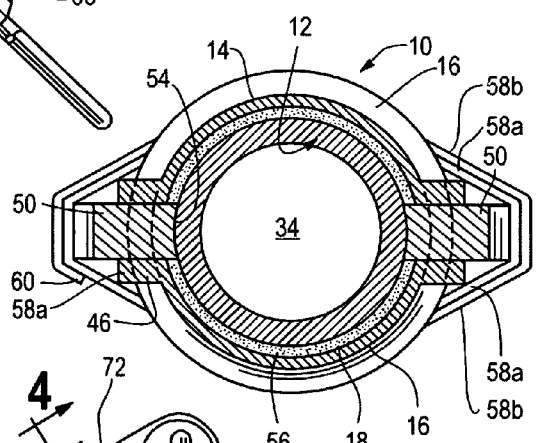
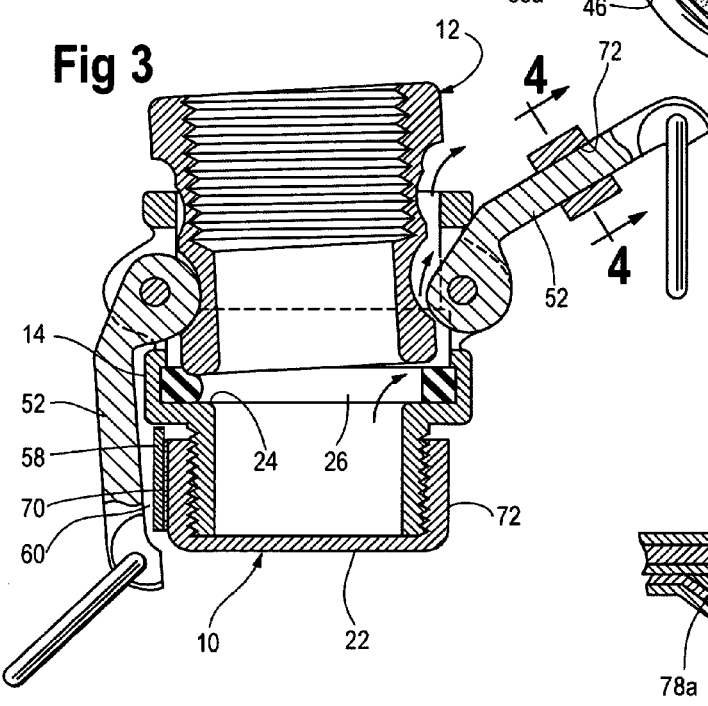
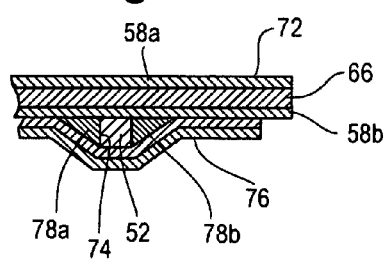

QUICK CONNECT/DISCONNECT COUPLER WITH LOCKING STRAP

The present invention relates to quick connect/disconnect couplings, and more particularly to quick connect/disconnect couplings which include locking means for preventing inadvertent disconnection of the coupling.

BACKGROUND OF THE INVENTION

Quick connect/disconnect couplers have appeared in the patent literature at least as early as Oct. 29, 1927, when U.S. Pat. No. 1,646,873 to P. Richards entitled Hose Coupling, issued. Quick connect/disconnect couplers are in widespread use for interconnecting conduits such as pipes and hoses, and are used in a wide range of sizes. A quick connect/disconnect coupler has a tubular inner member which is adapted to be mounted on a conduit, and which is translatable within a tubular outer member. The outer member is a part of an assembly that may connect to another conduit, such as a hose or pipe, or may be a cap for closing a pipe or the like, as in the present preferred embodiment.

When a quick connect/disconnect coupler is engaged, the tubular inner member is disposed within a channel of the outer member, and one end of the inner member abuts a confronting surface on the outer member to form a tight seal between the inner and outer members. The tubular inner member also has a groove about its outer surface in a plane normal to the axis of the inner member and confronting the inner surface of the outer member, the groove being disposed adjacent to the sealing surfaces of the inner and outer members. The groove has a radial surface and is disposed adjacent to the one end of the inner member.

The quick connect/disconnect coupler includes at least two cams that are mounted on the external surface of the outer member on pivotal axes disposed normal to the axis of the channel. The outer member also has a slot confronting each of the cams, the slots permitting the cams to extend through the outer member. When the inner member is disposed within the outer member with its one end abutting the sealing surface of the outer member, the pivotal axis of each of the cams is disposed at the center of the arcuate surface of the groove of the inner member. Each cam has an arcuate surface centered on its pivotal axis with the same radius of curvature as the arcuate surface of the groove, and in the locked position of the cams, the arcuate surfaces of the cams engage the groove driving the inner member against the scaling surface of the outer member, thus assuring a tight seal.

The quick connect/disconnect coupler is maintained in engaged position by the friction between the cams and the groove. To separate the inner and outer members, the cams must be rotated on their pivotal axes against the friction with the arcuate groove to a position within the slots and out of the channel of the outer member. U.S. Pat. No. 1,646,873 to P. Richards, referred to above, provided the pivotal axes of the cams with sockets to accommodate a wrench for this purpose, but subsequent quick connect/disconnect couplers, such as disclosed in U.S. Pat. No. 6,412,827 to Barclay et al. entitled Lockable Quick Connect/Disconnect Coupling, has incorporated lever arms on the cams to eliminate the need for a wrench. By rotating the lever arms from the "locked" position to the "open" position, thus freeing the inner member, the coupler may be disassembled.

While the use of lever arms to rotate the cams eliminated the need for a wrench to lock the inner and outer members of a coupler together, it also reintroduced the possibility of accidental disconnect of the coupler which was an object of Richards U.S. Pat. No. 1,646,873. Even though some force is requited to move the locking lever arms from the "locked" to the "open" position, especially if fluid carrying conduits which are joined by a coupling are under pressure, in the absence of any other protective device, the risk exists that one, or more, of the lever arms may be inadvertently moved from the "locked" position sufficiently far toward the "open" position to result in either leakage of fluid from the coupling, or even separation of the inner and outer members of the coupling.

DISCUSSION OF RELATED ART

Several attempts have been made to overcome this difficulty; examples are to be found in Moore, U.S. Pat. No. 3,439,942; Laffenberger, U.S. Pat. No. 3,976,313; Goodall et al., U.S. Pat. No. 4,295,670; Fahl, U.S. Pat. No. 4,618,171 and U.S. Pat. No. 5,005,876; Vargo, U.S. Pat. No. 4,647,075; and Parrish, U.S. Pat. No. 4,871,195. In these prior patents, three techniques have been used,"

The first technique is to provide a subsidiary locking means which is intended to prevent inadvertent movement of each lever arm. This comprises a member attached to the coupler that must be deflected in order to move the lever arm from the "locked" position, and is engaged when the lever arm is moved from the "open" to the "locked" position. Examples of this approach are Moore U.S. Pat. No. 3,439,042; Lauffenberger, U.S. Pat. No. 3,976,313; Vargo, U.S. Pat. No. 4,647,075 and Barclay et al. U.S. Pat. No. 6,412,827.

The second technique is to modify the lever arm so that it is more difficult to move it from the "locked" position. Examples of this are Fahl, U.S. Pat. Nos. 4,618,171 and 5,005,876.

The third technique is to provide an additional positive locking system, which must he separately engaged on each lever arm after each lever arm has been moved to the "locked" position, and separately disengaged from each lever arm before each lever arm can he moved from the "locked" position. Examples of this are Goodall et al, U.S. Pat. No. 4,295,670; and Parrish, U.S. Pat. No. 4,871,195.

While such devices reduce the likelihood of inadvertent opening of the coupler, they do so at the cost of convenience and of greater cost of construction of the coupler, and further most are defeatable by the operator with some ingenuity. Hence there remains a need for a convenient, low cost device that is likely to be used by the operator to maintain the lever arms of the cams of quick connect/disconnect couplers in locked position.

SUMMARY OF INVENTION

It is a general object of the present invention to provide a quick connect/disconnect coupler with a low cost, convenient means to lock the lever arms of the coupler in the "locked" position. The inventor has observed that quick connect/disconnect couplers require the lever arms to be pivoted to a position adjacent to the outer member to assume the locked position. By mounting a portion of a strap which is capable of being wrapped around the outer assembly of the coupler on the outer assembly and securing the strap on itself when the outer assembly is in locked position, the strap forms a loop about the outer assemble and retains the lever arms of the outer assembly in locked position adjacent to the outer member. Further, since a portion of the strap is mounted on the outer assembly of the coupler, this portion of the strap is anchored at its mounting area and cannot move. Hence, it is only necessary to retain the other portions of the strap loop in an orbit about the outer assembly to assure retention of the lever arms in the locked position, and there are several ways to accomplish this. First, if the outer assembly is an adapter coupled to an elongated pipe or hose, the strap loop will be too small to be forced over the end of the outer assembly and conduit. Even if the outer assembly is a short cap, the strap loop cannot be forced over the ends of the lever arms if the lever arms are of sufficient length. In addition, the strap can easily be retained in its orbit by shoulders disposed on the lever arms or outer member of the outer assembly.

In a preferred construction of the present invention, the strap is provided with exposed loops on one side and exposed hooks on the other side, and overlying portions of the strap when wrapped around the outer assembly adhere to each other. Accordingly, wrapping the strap about the outer assembly when the lever arms are in locked position and fastening the overlapping portion of the strap together requires merely pressing the overlapped and overlapping portions of the strap together.

DESCRIPTION OF THE DRAWINGS

For a more complete description of the present invention, reference is made to the accompanying drawings, in which:

FIG. 1 is a sectional view of a coupler according to one embodiment of the present invention with the outer assembly and inner member in locked engagement taken through the central axis thereof;

FIG. 2 is a sectional view taken along line 2-2 of FIG. 1;

FIG. 3 is a sectional view of a coupler according to another embodiment of the present invention with the outer assembly inadequately locked to the inner member taken on the same plane as FIG. 1; and FIG. 4 is a longitudinal sectional view of a strap that constitutes a third embodiment of the present invention.

DETAILED DESCRIPTION OF THC INVENTION

FIGS. 1 and 2 illustrate a preferred embodiment of the present invention. As illustrated in these figures, the quick connect/disconnect coupler has an outer assembly 10 and an inner member 12. The outer assembly 10 has an outer member 14 with a cylindrical outer surface 16, and a concentric cylindrical inner surface 18 forming an axial channel 20. While the channel 20 may be open at both ends to couple two conduits together, in the embodiment of FIGS. 1 and 2 the outer member 14 has an outwardly extending cylindrical nipple 21 with threads on its outer surface, and an end cap 22 with mating threads on an inner cylindrical surface 23 mounted on the nipple and extending across one end of the channel 20. The end cap 22 has a wall 25 that extends across and closes the channel 20.

The outer member 14 has a flat circular shoulder 24 disposed on a plane normal to the axis of channel 20 and extending inwardly from the inner cylindrical surface 18, and the shoulder 24 serves as a sealing surface when engaged with the inner member 12, as described hereinafter. An elastomer ring 26 with a rectangular cross section is disposed in abutment with the shoulder 24. The outer member 14 has another end 28 opposite the end wall 22 which is open and adapted to receive the inner member 12.

The inner member 12 has a cylindrical outer surface 30 of slightly smaller diameter than the inner surface 18 of the outer member 14 in order to make the inner member 12 translatable within the channel 20 of the outer member 14. The inner member 12 has a cylindrical inner surface 32 coaxial with the outer surface 30 which forms a passage 34 within the inner member 12. One end 36 of the inner member 12, which is referred to as the leading end, has a flat, circular surface 37 normal to the central axis of the inner surface 32 which is adapted to engage the elastomer ring 26 on the shoulder 24 of the outer member 14 when the inner member 12 is inserted into the outer assembly 10. The inner member 12 also has a trailing end 38 at the end of the inner member 12 opposite the leading end 36, and this end 38 is provided with a cylindrical threaded inner surface 40 for engaging a male connector of a hose, tank, manifold or the like.

The outer member 14 is provided with a pair of elongated slots 44 which extend through the outer member 14 and are disposed parallel to the central axis of the outer member 14 and on opposite sides of the central axis. A pair of walls 46 extends outwardly form the outer surface 16 of the outer member 14 on opposite sides of each slot 44, and a pin 48 is mounted on the walls 46 and extends between the walls 46 on a plane normal to the central axis of the outer member 14. A cam 50 in the form of a flat plate is pivotally mounted on each of the pins 48 on a plane normal to the pin 48. The cams 50 have integral lever arms 52 and are rotatable between a first or locked position in which each lever arm 52 is rotated toward the shoulder 24 abutting the outer surface 16 of the outer member 14, and a second position in which the lever arms 52 are substantially normal to the central axis of the outer member 14. Each cam 50 has a perimeteral surface 51 disposed about the axis of its pin 48 and the perimeteral surface 51 of each cam has a part cylindrical portion 54 that is coaxial with its pin 48. When the lever arms 52 are positioned in the first or locked position, the cams 50 extend through the slots 44 and into the channel 20. The part cylindrical portion 54 of each of the cams 50 extends from the edge of its slot 44 closest to the shoulder 24 of the outer member 14 to the plane through its pin 48 normal to the central axis of the outer member 14. The radii of all other portions of the cams 50 are less than the radius of the arcuate portion 54, and when the lever arm 52 of either cam is disposed generally normal to the central axis of the outer member 14, all portions of the cam are dispose out of the channel 20 of the outer member 14.

The inner member 12 of the quick connect/disconnect coupler has a circumferential groove 56 extending about its outer surface 30 on a plane perpendicular to the central axis of the inner member 12 and spaced from the leading end 36 of the inner member 12 by a distance slightly greater than the distance between the radial plane of the pins 48 and the plane of the sealing surface of the elastomer ring 26. The radial cross-section of each groove 56 has a part circular portion extending from the radial plane of the center line of the groove 56 to the radial plane of the intersection of the groove 56 and outer surface 30 of the inner member 12 adjacent to the leading end 36, designated 56A in FIG. 1. The radius of curvature of this portion of the groove 56 approximately equals that of the arcuate portion 54 of the cams 50. When the lever arms 52 are in the first, or locked position, illustrated in FIGS. 1 and 2, the arcuate portions 54 of the cams 50 engage the surface of the groove 56 of the inner member 12, and urge the leading end 36 of the inner member 12 against the elastomer ring 26 to affect a tight seal. The cams 50 are retained in their rotational positions by friction between the cams 50 and the groove 56, and are restrained from further rotation in the locking direction by the abutment of the cam lever arms 52 against the outer member 14.

In accordance with the present invention, an elongated strap 58 is mounted at or adjacent to one end 60 on one of the lever arms 52*a* by a pair of self taping screws 62, the other lever arm being designated 52*b*. There is an advantage to mounting the strap 58 at or adjacent to one end in that it facilitates wrapping the strap around the outer assembly, even using one hand. The strap 58 is constructed of two elongated strips 64*a* and 64*b* of fabric material, preferably nylon, glass fiber or other man made fiber, the strips 64*a* and 64*b* being mounted back to back on each other in any conventional manner, such as sewing or by a layer 66 of adhesive disposed between the strips 64*a* and 64*b*, thus forming the single elongated strap 58. One of the strips 64*a* exposes loops on the front surface of the strip, and the other strip 64*b* exposes hooks on the front surface of the strip. When the quick connect/disconnect coupler is engaged with its lever arms 52 disposed adjacent to the inner member 14, the strap 58 may be wound about the lever arms 52*a* and 52*b* and outer member 14, as illustrated in FIGS. 1 and 2, and the portion of the strap 58 that forms at least a fraction of a second turn, designated 58*b*, will over lap a part of the first turn, designated 58*a*, of the strap 58, thus exposing the loops of strip 64*b* to the hooks of strip 64*a*. With slight pressure from wrapping the strap 58 about the outer assembly 10, the hooks will engage the loops of strap 58 in the over lapping portion of the strap 58, and the strap 58 will become secured without the need for an external clasp or attachment device. Further, all of the over lapped portion of the strap 58 will become bound together, not just the ends of the strap 58, as in the case of a strap with a mechanical clasp.

The fact that the entire overlying portion of the strap 58 is secured on the underlying portion makes it much more difficult to force the looped strap 58 over the end of the lever arm 52*b* and the end wall 22 of the outer member 14 of the assembled quick connect/disconnect coupler than in the case of a strap with an end clasp. Further, this possibility is optionally substantially eliminated by a shoulder 68 integral with and extending outwardly from the side of the lever arm 52*b* opposite the outer member 14, the shoulder being positioned to maintain the strap 58 in an orbit aligned with the end wall 22 of the outer member 14. To open the coupler, it is only necessary to apply relatively light force at the end of the strap 58 opposite the anchor to unwind the over lapped portion of the second 58*b* from the first turn 58*a*, release the cams 50 by rotating the lever arms 52 to the unlocked position, and withdraw the inner member 12 from the outer member 10.

The length of the strap 58 determines the length of the over lap portion 58*b* of the strap 58 and determines the strength of the lock on the lever arms 52. The inventor has found that the strap 52 must be at least one and one-forth times the length of the circumference of the outer assembly 10, and is preferably at least one and one-half times the circumference of the outer assembly 10. In the preferred construction described herein, the strap 58 is one and three-quarters times the circumference of the outer assembly 10, thus providing an over lap portion of the strap of three-fourths the length of the circumference of the outer assembly 10.

The strap 58 may be mounted on the outer member 14 rather than on a lever arm 52, as illustrated in one of the embodiments of FIG. 3. In this embodiment the same reference numerals that were used above are used to identify identical parts in this embodiment. A strap 58 of identical construction to the strap 58 described above is mounted at its end 60 by a layer 70 of adhesive on the cylindrical outer surface 72 of the outer member 14. The strap 58 is engaged on the quick connect/disconnect coupler in the same manner as described for the embodiment of FIGS. 1 and 2.

FIGS. 3 and 4 also illustrate another embodiment of the invention in which a strap 72 is provided with a pocket or channel 74 to accommodate one of the lever arms 52 of the outer assembly 10. The strap 72 is identical to the strap 58 except for the addition of an elongated pocket forming flap 76 secured at one end to one of the sides of the strap in a conventional manner such as sewing. The surface of the flap 76 that is adjacent to the side of the strip 72 is provided with hooks or loops that mate with the hooks or loops on the adjacent surface of the strip. In FIG. 4, strip 58*b* of the strap 72 exposes hooks on its surface confronting the flap 76, and the flap exposes loops confronting the strip 58*b*. With the hooks disengaged from the loops of the strap 72, it may be positioned about one of the lever arms 52 of the outer assembly 10 illustrated in FIG. 3, and the flap 76 and strip 58*b* engaged to form a pocket about the selected lever arm 52 to retain the strip in position. Optionally, solid elongated triangular members 78*a* and 78*b* are mounted in spaced parallel relation on the strip 58*b*, as by cement, thus providing confronting parallel walls for the pocket which engage opposite sides of the rectangular lever arm 52 and restrict rotational motion of the strap 72 with respect to the lever arm.

In all three embodiments, an operator completes a connection by first pivoting the lever arms 52 away from the outer member 14 to the unlocked position, then inserting the inner member 12 into the channel 20 of the outer member 14 until the flat end surface 37 of the inner member 12 abuts the elastomer ring 26. Then the lever arms 52 are pivoted into the closed position against the outer member 14, and finally the strap 58 is wound over the lever arms 52 and about the outer assembly 10, and pressure is applied to the overlapping portion of the strap to attach the overlapping portion to the underlying portion of the strap.

FIG. 3 also illustrates the likely result if one of the cams releases from its locked position during operations. A very slight misalignment of the inner member 12 within the outer member 14 results in leakage past the ring 26. The present invention is designed to prevent this leakage from happening. An operator is not likely to overlook the strapping step when closing the coupler since the strap 58 is a part of the coupler outer assembly 10. The operator is even less likely to overlook the strapping operation when the strap 58 is mounted on one of the lever arms 52 which must be used to close the quick connect/disconnect coupler.

Those skilled in the art will devise constructions other than those set forth in this specification including but not limited to mounting a different portion of the strap on the outer assembly than the end, employing mounting means for the strap other than screws or adhesive, and providing barriers other than those disclosed herein for retaining the engaged strap in its designated orbit. It is therefore intended that this invention be defined not by the foregoing specification, but rather only by the appended claims.

The invention claimed is:

1. An outer assembly for a quick connect/disconnect coupling, said outer assembly being adapted to accommodate and engage an inner member having a passage there through and a surface at one end of the passage adapted to seal on a surface of the outer assembly, said inner member having an exterior surface with a recess thereon, said outer assembly comprising an outer member having a channel with a central axis extending therein adapted to receive the inner member, and a sealing surface adapted to abut and seal on the sealing surface of the inner member when the inner member is disposed and engaged within the channel of the outer member, a plurality of cams pivotally mounted on the outer member on pivotal axes exterior to the outer member and normal to the central axis of the channel, said outer member having a slot extending there through confronting and adapted to accommodate each cam, each cam having a lever arm extending there from and being rotatable between a closed position in which the lever arm is disposed adjacent to the exterior surface of the outer member and the cam extends through the confronting slot and is adapted to engage the inner member, and an open position in which the lever arm is disposed remote from the surface of the outer member and the cam is withdrawn from the passage, and a strap mounted on the outer assembly of sufficient length to encircle the outer member on a plane generally normal to the axis of the channel in the outer member, said strap having means to attach two spaced portions of the strap to each other to secure the strap tightly about the outer assembly.

2. An outer assembly for a quick connect/disconnect coupling comprising claim 1 wherein the strap is of sufficient length to encircle the outer assembly at least one and one-fourth times, the strap being an elongated generally straight, flexible ribbon with parallel opposite sides, the opposite sides being constructed to adhere to each other on contact and manually disengage on application of a manual separating force.

3. An outer assembly for a quick connect/disconnect coupling comprising claim 2 wherein the strap has two strips of fiber, each strip having two opposing sides, one strip having hooks on one side and the other strip having loops on one side, the hooks and loops of the two strips adhering together when pressed together, and the two strips being attached to each other with the other sides of the strips confronting each other to form a strap.

4. An outer assembly for a quick connect/disconnect coupling comprising claim 3 wherein the strap has a length between one and one-fourth and twice the perimeter of the outer assembly.

5. An outer assembly for a quick connect/disconnect coupling comprising claim 3 wherein the strap is mounted on the outer member between adjacent cams.

6. An outer assembly for a quick connect/disconnect coupling comprising claim 3 wherein the strap is mounted on one of the lever arms of the outer assembly.

7. An outer assembly for a quick connect/disconnect coupling comprising claim 6 wherein a portion of the strap adjacent to one end of the strap is mounted on one of the lever arms of the outer assembly.

8. An outer assembly for a quick connect/disconnect coupling comprising claim 1 wherein a lever arm is provided with an outwardly extending shoulder disposed on the side of the lever arm opposite the cam between the pivotal axis of the cam and the opposite end of the lever arm to retain the strap in the plane in which the strap encircles all of the lever arms of the outer assembly.

* * * * *